United States Patent
Peng

(10) Patent No.: US 10,492,022 B2
(45) Date of Patent: Nov. 26, 2019

(54) SYSTEM AND METHOD FOR ROBUST AND ACCURATE RSSI BASED LOCATION ESTIMATION

(71) Applicant: Semtech Corporation, Camarillo, CA (US)

(72) Inventor: Mengkang Peng, Berkshire (GB)

(73) Assignee: Semtech Corporation, Camarillo, CA (US)

(*) Notice: Subject to any disclaimer, the term of this patent is extended or adjusted under 35 U.S.C. 154(b) by 0 days.

(21) Appl. No.: 15/296,740

(22) Filed: Oct. 18, 2016

(65) Prior Publication Data
US 2017/0156027 A1    Jun. 1, 2017

(30) Foreign Application Priority Data
Nov. 30, 2015 (EP) .................................... 15197115

(51) Int. Cl.
H04W 24/00 (2009.01)
H04W 4/021 (2018.01)
H04B 17/318 (2015.01)
G01S 5/02 (2010.01)
H04W 88/16 (2009.01)

(52) U.S. Cl.
CPC ............ H04W 4/021 (2013.01); G01S 5/02 (2013.01); H04B 17/318 (2015.01); H04W 88/16 (2013.01)

(58) Field of Classification Search
CPC .................................................. H04W 4/021
See application file for complete search history.

(56) References Cited

U.S. PATENT DOCUMENTS

| | | | | |
|---|---|---|---|---|
| 9,668,233 | B1* | 5/2017 | Horner | H04W 64/00 |
| 2015/0312719 | A1* | 10/2015 | Cho | H04W 4/027 |
| | | | | 455/456.5 |

FOREIGN PATENT DOCUMENTS

KR    101077967 B1    8/2011

OTHER PUBLICATIONS

Extended European Search Report for EP Application No. 16196989.4, dated Apr. 20, 2017, 9 pages.
J. Wang, et al., "Weighted Centroid Localization Algorithm: Theoretical Analysis and Distributed Implementation", IEEE Transactions on Wireless Communications, vol. 10, No. 10, Oct. 2011, pp. 3403-3413.
B. Li, et al., "A Low Complexity Localization Algorithm in Wireless Sensor Network", 2010 International Conference on Innovative Computing and Communication and 2010 Asia-Pacific Conference on Information Technology and Ocean Engineering, pp. 217-220.
S. Xianhao. et al., Node Self-Localization Algorithm Based on RSSI in Wireless Sensor Networks Outdoor, 2010 International Conference on Intelligent System Design and Engineering Application. pp. 1010-1012.

* cited by examiner

*Primary Examiner* — Justin Y Lee
(74) *Attorney, Agent, or Firm* — Blank Rome LLP

(57) ABSTRACT

The present invention proposed a weighted Centroid Localisation (WCL) algorithm, which does the location estimation based only on the known positions of the gateways and the measurements of the Received Signal Strength Indication (RSSI) at the gateways. The algorithm computes the weight of the gateway based on their rank when the gateways are sorted by their relative RSSI. Simulations have demonstrated the algorithm's robustness under different multipath/fading channel conditions and its good location performance.

4 Claims, 2 Drawing Sheets

SYSTEM AND METHOD FOR ROBUST AND ACCURATE RSSI BASED LOCATION ESTIMATION

REFERENCE DATA

The present application claims priority of European patent application EP15197115.7 of Nov. 30, 2015, the contents whereof are incorporated by reference in their entirety.

TECHNICAL FIELD

Embodiments of the present invention relate to the field of determining a position of a mobile electronic device.

BACKGROUND

In IOT (Internet of Thing) and many other location related applications, It is required that an infrastructure be able to estimate the position of one or several wireless objects or target nodes. It is still a great challenge to achieve accurate location estimation in a wireless environment at low cost. This invention is to present a simple method to achieve a robust location estimation with good accuracy at low cost.

In a typical location estimation system, there are several reference nodes, or gateways, whose locations are known, and one or several target nodes or motes, whose locations are to be estimated. In order to estimate the location of the target node, some metrics characterising the positioning information of the target node against the reference nodes, such as the distance or angles, needs to be measured through either the radio transmission by the target node and received by the reference nodes, or the other way around. In this invention, we consider the case where the target node makes radio transmission, which is received by the gateways (reference nodes) around it.

The following description describes examples of the invention in which the position of the mobile node is determined in a 2-dimensional plane. Albeit important, this application is not limiting and the invention includes as well variants in which the mobile nodes are localised in a 3-dimensional space.

BRIEF SUMMARY OF THE INVENTION

The present invention proposed a weighted Centroid Localisation (WCL) algorithm, which does the location estimation based only on the known positions of the gateways and the measurements of the Received Signal Strength Indication (RSSI) at the gateways. As well-known for those skilled in the art, although there have been a variety of academic research as wells as patent publications relating to WCL location algorithm or close fields, the design of a simple and robust WCL algorithms with good location accuracy remains a major challenge. This is the issue this invention attempts to solve

DETAILED DESCRIPTION OF EMBODIMENTS OF THE INVENTION

Figure 1:
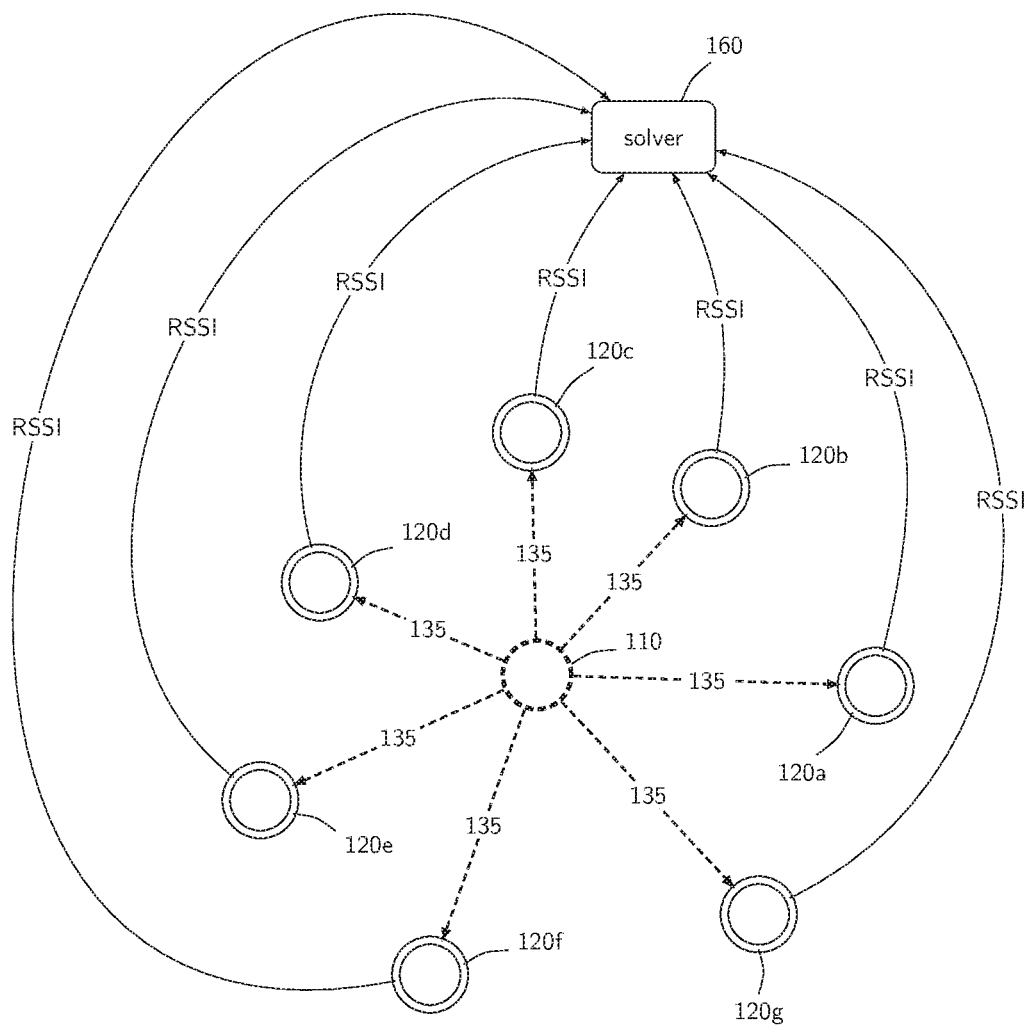
FIG. 1 illustrates in schematic simplified manner, a process of localization by which a plurality of gateways receive a localization packet transmitted by a mobile node and determine its location by means of a solver that processes the RSSI information of the packets at each gateway.
Figure 2:
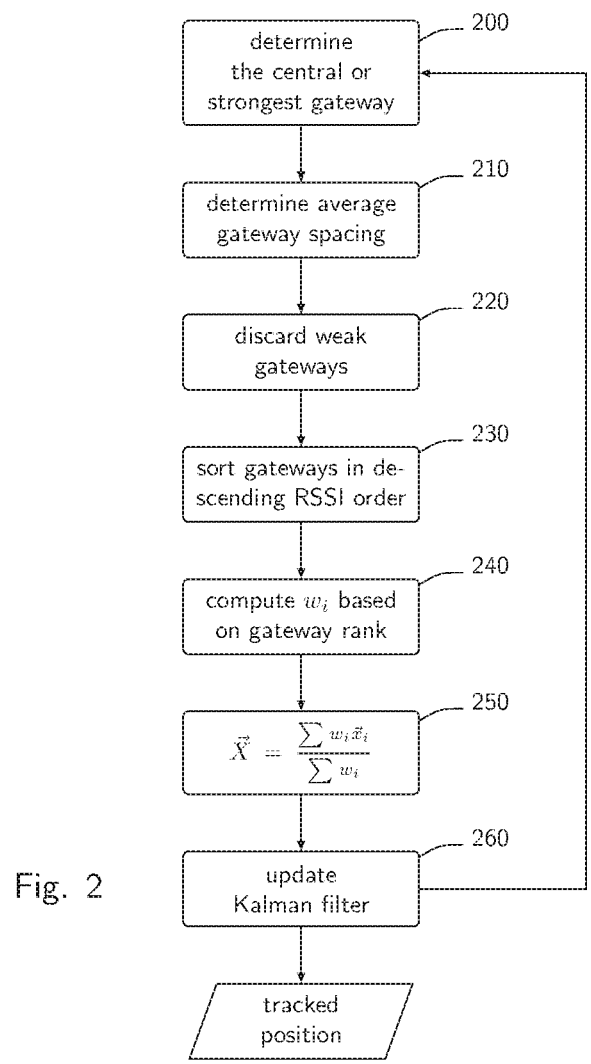
FIG. 2 represents, by a flowchart, a possible implementation of the inventive method.

Location estimation systems can, in general, be divided into two categories, i.e.: range-based and range-free methods. Typical range-based system makes use of TOA (Time of Arrival) or TDOA (Time Difference of Arrival) information, which requires accurate time stamping devices to obtain the distance information between the target node and gateways and it uses trilateration approach to obtain the target node's location. Location algorithm based on RSSI can fall into either range-based or range-free method.

It is well-known for those skilled in the art that the radio signal transmission over distance follows the following rule:

$$P_r = \frac{P_t \cdot G_t \cdot G_r \cdot v^2}{4\pi \cdot d^b}$$

where $P_r$ is the received signal power, i.e., the RSSI; $P_t$ is the transmitted power, $G_t$ is the transmitter antenna gain, $G_r$ the receiver antenna gain, w the wavelength of the radio and d is the distance from the transmitter to the receiver. b is called path loss exponent (PLE). For the free space transmission, b=2, while for more general transmission environment with multipath fading, b has a value between 1.6 and 5.

Equation above can be re-written in a more convenient format as below:

$$P_r = P_0 \cdot (d_0/d)^b$$

where $P_0$ is the received power at a reference distance $d_0$.

As the power is commonly expressed in dB format, we can have $$RSSI(dB) = P_0(dB) + 10 \cdot b \log_{10}(d_0/d) + n$$

The last term n in the equation is the measurement error, represented as zero-mean Gaussian noise.

Equation above clearly shows the relationship between the receiving signal power RSSI, and the distance d from the target node to gateways.

Through a calibration process, the $P_0$ for a given $d_0$, as well as the path loss exponent b can be estimated. Then the distance d can be obtained from the measured RSSI. The problem is thus transformed into a range-based problem. This method is, in general, complicated as it requires regular calibration process to estimate and update the parameters in the signal transmission model. Due to the error in transmission parameter estimation and the error in RSSI measurement, this method does not necessarily lead to good performance.

This invention is focused on a range-free WCL method. Specifically we propose a simple and effective weight computing method as well as active gateways selection strategy to achieve robust and good accuracy location estimation.

Robust WCL Algorithm

Assume there are a total N gateways, whose locations are $(x_i, y_i)$; $(i=0, \ldots N-1)$, the general form of the WCL algorithm proposes computing the position of the mobile device by a weighted (vectorial) sum of the position of the gateways using a set weight factors, which can be expressed as:

$$X = \frac{\sum_{i=0}^{N-1} w_i x_i}{\sum_{i=0}^{N-1} w_i}$$

$$Y = \frac{\sum_{i=0}^{N-1} w_i y_i}{\sum_{i=0}^{N-1} w_i}$$

where $w_i$ is the weighting factor for $GTW_i$; ($i=0, \ldots N-1$), X and Y are the estimated location of the target node.

The key design issue here is the way to determine the weighting factor $w_i$. The selection of a subset of all receiving gateways used for the weighted averaging is also important. The invention can be summarised as below:

1. Determine the "central gateway", which could, for example be achieved by selecting the gateways with biggest the RSSI value.
2. Calculate the averaging gateway spacing between adjacent gateways. This is achieved by first calculating the minimum of the distances from each gateway to all other gateways. Then for all the minimum distances from all gateways, its median value is used as the averaging gateway spacing.
3. Exclude those gateways too far away from the "central gateway" from location calculation. This is done by comparing the distance from all gateways to the "central gateway" against a threshold value, which equals to the averaging gateway spacing multiplied by a scaling factor. Those gateways are excluded if their distances are bigger than the threshold, otherwise they are kept.
4. Assuming a total of N gateways are kept, sort corresponding RSSI in the descending order, i.e.

$RSSI_0 > RSSI_1 > \ldots > RSSI_{N-1}; (i=0, \ldots N-1)$

5. In the case there are more than one RSSI measurements from gateway the median value of all RSSI values from this gateway is used as the RSSI in step 4.
6. The weighting factor is calculated by:

$w_i = (1 + RSSI_i - RSSI_{N-1}) \cdot (N-1)^2; (i=0, \ldots N-1)$

7. The estimate of target node's location is obtained using the weights defined in step (6).
8. Up to step 7, a one-shot estimate of the target node's location is obtained. In the case that the target node makes regular transmission per certain period, a tracking algorithm, such as the Kalman type filter, is used to track the move of the target node and to further improve location accuracy.

The main idea for the above weighting factor calculation is that heavier weights are given to those gateways, whose RSSI are bigger, as they are likely to be closer to the target node. It can be observed from the equation yielding the weights $w_i$, that the weight factors are mainly determined by the rank order rather than the absolute value of the RSSI. Combined with the procedure defined in steps 4) and 5), this makes the algorithm very robust to the variation of the RSSI due to either channel fading or measurement errors.

The weighting factor are also partly depending on the difference of RSSI'i over the smallest RSSI, which takes into account the relative value of the RSSI to further enhance the location accuracy. Simulation has demonstrated the algorithm's robustness under different multipath/fading channel conditions and its good location performance.

The invention claimed is:

1. A system comprising at least a mobile device and a plurality of gateways whose positions are known, wherein the gateways are operatively arranged to determine for each gateway a received signal strength indicator, the system comprising a solver unit operatively arranged to compute a position of the mobile device, based on said received signal strength indicators, characterised in that the solver unit is arranged to sort the gateways and determine a sorted list of gateways ordered by received signal strength indicators, compute for each gateway a weight factor based on a rank of that gateway in the sort, the system being further arranged to compute the position of the mobile device by a weighted sum of the position of the gateways using said weight factors, wherein the weight factors are calculated by:

$RSSI_0 > RSSI_1 > \ldots > RSSI_{N-1}; (i=0, \ldots N-1)$ $w_i = (1 + RSSI_i - RSSI_{N-1}) \cdot (N-1)^2; (i=0, \ldots N-1)$ wherein N denotes the number of gateways, and i an index from 0 to N−1, and $RSSI_i$ the received signal strength indicator of a gateway and $w_i$ the weight factor.

2. The system of claim 1, further arranged to compute the position of the mobile device by a weighted sum of the position of the gateways using said weight factors.

3. A method of determining a position of a mobile device relative to a plurality of gateways whose positions are known, comprising:
   determining for each gateway a received signal strength indicator,
   sorting the gateways and determine a sorted list of gateways ordered by received signal strength indicators,
   computing for each gateway a weight factor based on a rank of that gateway in the sort,
   computing the position of the mobile device by a weighted sum of the position of the gateways using said weight factors, Wherein the weight factors are calculated by:

$RSSI_0 > RSSI_1 > \ldots > RSSI_{N-1}; (i=0, \ldots N-1)$ $w_i = (1 + RSSI_i - RSSI_{N-1}) \cdot (N-1)^2; (i=0, \ldots N-1)$ wherein N denotes the number of gateways, and i an index from 0 to N−1, and $RSSI_i$ the received signal strength indicator of a gateway and $w_i$ the weight factor.

4. The method of claim 3, comprising computing the position of the mobile device by a weighted sum of the position of the gateways using said weight factors.

* * * * *